United States Patent [19]

Muller et al.

[11] 4,034,264

[45] July 5, 1977

[54] ARRANGEMENT FOR DETECTING A DEFICIENT OPERATIONAL CAPABILITY OF A VACUUM SWITCHING VESSEL

[75] Inventors: Kurt Muller; Hans-Jurgen Lendt; Manfred Rimmrott, all of Berlin, Germany

[73] Assignee: Siemens Aktiengesellschaft, Munich, Germany

[22] Filed: Apr. 2, 1975

[21] Appl. No.: 564,377

[30] Foreign Application Priority Data

Apr. 2, 1974 Germany .......................... 2416318

[52] U.S. Cl. ................................ 361/2; 200/144 B; 337/412; 337/265; 340/242; 361/120

[51] Int. Cl.[2] .......................................... H02H 7/22

[58] Field of Search ............ 337/79, 241, 265, 402, 337/404, 412, 407, 413, 416; 340/250, 242; 317/40 R, 40 A, 9 AC, 66, 11 R, 58, 62, 73; 335/208, 151-154; 200/144 B, 148 G, 148 B

[56] References Cited

UNITED STATES PATENTS

| | | | |
|---|---|---|---|
| 1,666,339 | 4/1928 | Miller | 337/265 |
| 2,318,607 | 5/1943 | Grant, Jr. | 337/412 |
| 2,478,117 | 8/1949 | Mesh | 335/208 |
| 2,659,789 | 11/1953 | Lang | 337/265 |
| 2,983,806 | 5/1961 | Fawkes | 317/40 R X |
| 3,214,544 | 10/1965 | Leeds | 317/40 R X |
| 3,403,297 | 9/1968 | Crouch | 317/58 X |
| 3,404,247 | 10/1968 | Glassanos | 200/144 B |
| 3,469,217 | 9/1969 | Linton | 335/208 |
| 3,493,952 | 2/1970 | Jette | 200/144 B X |
| 3,626,125 | 12/1971 | Tonegawa | 200/144 B |
| 3,742,417 | 6/1973 | Snipeliski | 337/401 |
| 3,814,885 | 6/1974 | Sofianek | 200/144 B |
| 3,864,960 | 2/1975 | Fletcher et al. | 340/242 X |

*Primary Examiner*—J D Miller
*Assistant Examiner*—Patrick R. Salce
*Attorney, Agent, or Firm*—Kenyon & Kenyon, Reilly, Carr & Chapin

[57] ABSTRACT

The invention is directed to an arrangement for detecting deficient operational capability in a vacuum switching vessel. The arrangement can provide a signal if a fault occurs which affects the operability of the switching vessel. Instead of a signal, a protective device alone or together with the signal can also be caused to respond. The arrangement includes a body of a material which changes its physical characteristics substantially in a limited temperature interval and is attached in heat-conducting contact with a part of the vacuum switching vessel which has a temperature time constant as small as possible. This change of the characteristics of the body acts to initiate the above-mentioned signal or action of the protective device. The invention is suited particularly for application in switchgear with vacuum switching vessels.

8 Claims, 3 Drawing Figures

ARRANGEMENT FOR DETECTING A DEFICIENT OPERATIONAL CAPABILITY OF A VACUUM SWITCHING VESSEL

BACKGROUND OF THE INVENTION

The invention relates to an arrangement for detecting deficient operational capability of vacuum switching vessels which cause a signal to be given and/or causes a protective device to respond if a fault occurs.

The known vacuum switching vessels always require for proper operation a vacuum in the range of $10^{-4}$ to $10^{-7}$ Torr. If the vacuum becomes worse for any reason, the vacuum vessel can no longer interrupt the currents for which it is constructed. Then, the danger exists that an arc remains between the open contacts which damages or destroys the switching vessel and possibly also the switchgear in which the switching vessel is installed.

Damage of this kind can in principle be avoided by monitoring physical quantity determinative of the operational capability, namely, the vacuum. For instance, a signal could be given if the vacuum falls below a minimum value, or a protective device, for example, the tripping of a series-connected automatic protective circuit breaker could be made to respond simultaneously with the giving of a signal. Although the technical means are available for determining the vacuum and for evaluating the measured values, such means cannot be utilized in practice because the effort required and the cost is too high.

It is already known for monitoring the vacuum to provide a mechanical device which consists of an additional bellows-like part which is idle if the vacuum is correct, but executes a movement if the vacuum is diminished; this movement can be used to deliver a signal or to initiate protective measures. The bellows-like part, however, makes necessary a relatively complicated change in the construction of the switching vessel. In this connection, reference may be had to Deutsche Offenlegungsschrift 2,014,739.

Accordingly, it is an object of the invention to provide a detection arrangement which utilizes the principle of temperature dependence and affords the advantage of a simple evaluation as well as requiring only minor changes to the vacuum vessel itself.

SUMMARY OF THE INVENTION

The arrangement according to the invention includes detection means in heat-conducting contact with a part of the vacuum switching vessel that has a small temperature time constant. The detection means can be a body of a material which changes its physical characteristics substantially in a limited temperature interval. Such a body can be attached on the outside of the vacuum switching vessel, for example, at the stationary connecting post of the vessel, and can be connected to a switch contact.

Advantageously, the body can consist of one of the socalled Heusler alloys, which coacts with a permanent magnet which is spring-loaded and is in connection with a switch contact. The Heusler alloy looses its ferromagnetic properties in a limited temperature range, so that the permanent magnet can be pulled away from the body by a spring. To equip a vacuum switching vessel with an arrangement of this kind requires only little effort because the body of the Heusler alloy can be attached at the end of the stationary connecting post. Because the connecting post, due to its relatively large cross-section and its high thermal conductivity, assumes a higher temperature relatively quickly if, because of a defect of the switching vessel, a switching arc is not extinguished, a rapid response of the arrangement is assured.

According to an alternate embodiment, the detection means can be in the form of a body looses its mechanical strength at elevated temperature; this body can be used to support the switching element of a switch. For example, for this purpose a filament of a thermoplastic material is suitable which is connected with the stationary connecting post of the vacuum switching vessel. Plastic materials are available which soften in the temperature range of interest and either suffer in the process a great elongation under the influence of a spring or separate. Since the plastics which are of interest for this purpose are good insulators, the voltage-carrying connecting post of the vacuum switching vessel is at the same time separated electrically from the protective device.

Detection means in the form of a bursting capsule filled with liquid can also be used to support the switching element of the switch according to still another embodiment of the invention. Involved here are thin-walled glass vessels which are filled with liquid except for a small air space. The liquid expands with increasing temperature and compresses the remaining gas until the glass capsule can no longer withstand the pressure. As bursting capsules of this kind do not age, a protective device is created thereby which is equally effective over long periods of time.

A protective circuit breaker connected in series with the vacuum switching vessel can, for instance, be actuated as the protective device to be energized by the temperature-dependent arrangement. If the vacuum switchgear which is to be equipped with the temperature-dependent arrangement is to have a protective device in the form of a contactor, the arrangement responding to the elevated temperature may, for instance, cause the interruption of the supply circuit of the exciter winding of the actuating magnet of the contactor. It will thereby be possible as a rule to prevent damage, since by means of a two-pole interruption, the supply to three-phase loads can be interrupted. This is based on the assumption that it will indeed be a rare occurrence that more than one vacuum switching vessel per switchgear becomes defective at the same time.

In addition to the arrangements described, one can provide at the switching vessels an identifying mark by means of a temperature-sensitive paint, which makes it easier in multipole switchgear to recognize the defective switching vessel.

Although the invention is illustrated and described herein as an arrangement for detecting a deficient operational capability of a vacuum switching vessel, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
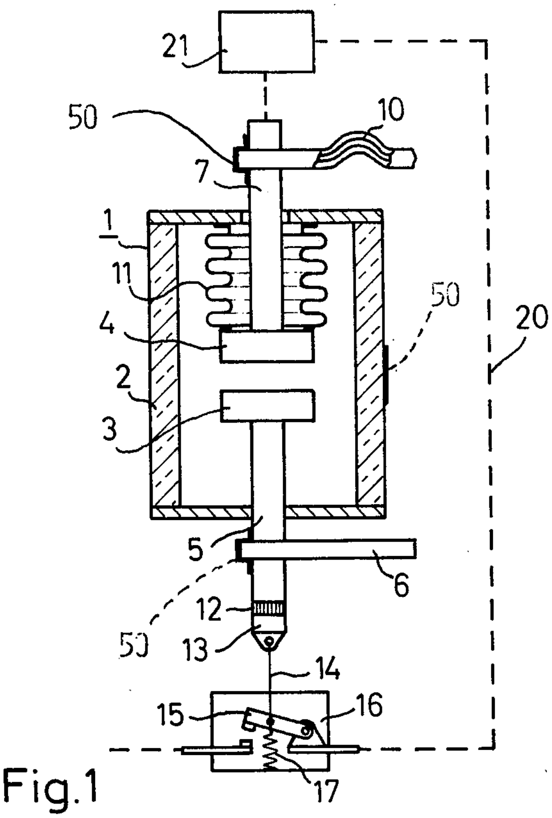
FIG. 1 shows schematically a vacuum switching vessel in longitudinal cross-section equipped with a detection arrangement according to the invention. Here, the detection arrangement includes a permanent magnet for coacting with detection means in the form of a body made of a Heusler alloy.

The vacuum switching vessel 1 in FIG. 1 has a housing 2 wherein a stationary contact 3 and a movable contact 4 are located. To supply current to the stationary contact 3, there is provided a stationary connecting post 5 connected with a bus bar 6. The movable contact 4 is located at the end of a movable connecting post 7 which is connected with a terminal of the switchgear through a current-carrying ribbon assembly 10. The vacuum-tight connection between the movable contact 4 and the housing 2 is provided by spring bellows 11.

At the lower end of the stationary connecting post 5, a body 12 of Heusler alloy is arranged; this body looses its ferromagnetic properties at a desired temperature, for example, 100° C, and becomes paramagnetic.

Heusler alloys are alloys of manganese and tin, aluminum, arsenic, antimony, bismuth or boron with an addition of copper. Depending on the choice of the alloy components, different transition temperatures from the ferromagnetic to the paramagnetic state are obtained.

At the normal operating temperature, a permanent magnet 13 adheres to the body 12. The magnet 13 in turn is coupled through an insulating connection 14 with the switching element 15 of a switch 16. The switching element 15 and thereby, the permanent magnet 13 are under the influence of a tension spring 17. If therefore, the adhesion force of the permanent magnet 13 falls below a given value because the ferromagnetism of the body 12 decreases, the permanent magnet 13 is pulled away from the body 12, and the switching element 15 is closed under the influence of the spring 17. By means of the functional connection 20, shown by a dashed line, the schematically shown actuating device 21 can thereby be influenced to act on the movable connecting post 7 of the vacuum switching vessel to open the latter.

The permanent magnet and the spring-loaded switch conjointly define transducer means for translating the change in physical characteristics of the body into a signal for actuating the actuating device 21. The actuating device 21 constitutes interrupting means for interrupting the flow of current through the vacuum switching vessel 1.

On the other hand, the switch 16 may also serve to cause an acoustic and/or optical warning signal to be given and to disconnect a series-connected protective device such as a power circuit breaker which opens the circuit of the vacuum switching vessel.

Figure 2:
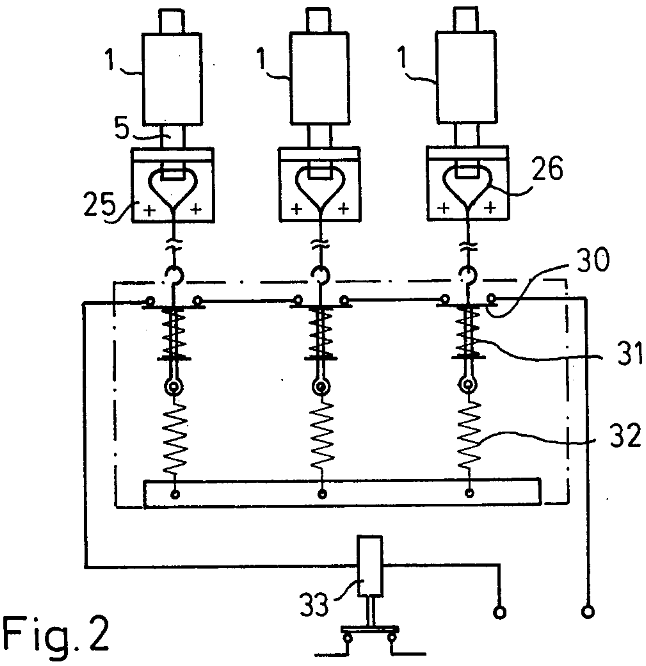
FIG. 2 illustrates a detection arrangement for a three-pole vacuum switchgear equipped with detection means in the form of temperature responsive filaments of thermoplastic material according to another embodiment of the invention.

In FIG. 2, three vacuum switching 1 are shown side by side having respective stationary connecting posts 5 held in clamping devices 25. Through a slot or a transverse bore at the lower end of the connecting posts 5, a loop is a filament 26 is pulled, the filament consisting of thermoplastic material. Each filament holds one switching element 30 with a contactpressure spring 31 in the closed position against the force of a tension spring 32. The switching elements 30 are connected in series with each other and with the coil 33 of a signal relay or the coil of the tripping magnet of the switchgear. If one of the loops 26 is severed or extended by too high a temperature of one of the connecting posts 5, the associated switching member 30 is opened under the influence of the tension spring 32, and the signal relay causes a warning signal to be given or causes the switchgear to be disconnected. If the switching elements 30 are arranged in the circuit of the coil of the tripping magnet of a contactor, the contactor is immediately caused to open.

Figure 3:
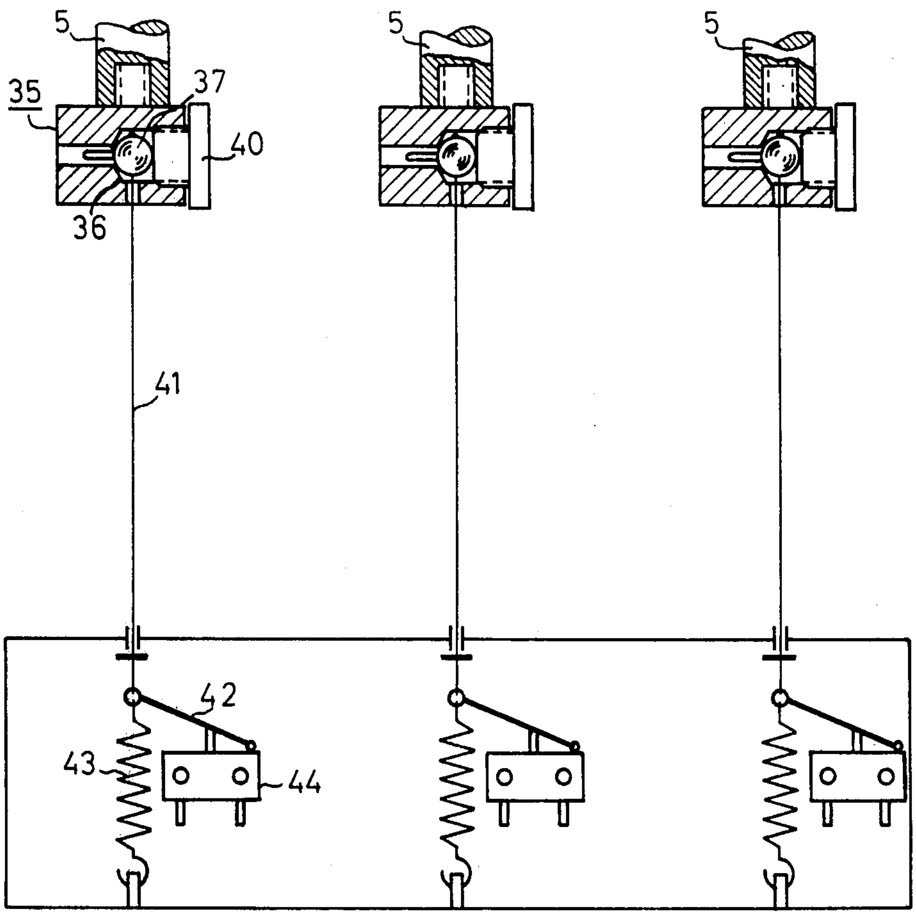
FIG. 3 illustrates a detection arrangement which includes detection means in the form of temperature sensitive bursting capsules according to still another embodiment of the invention.

In FIG. 3, an arrangement with a similar external construction is shown wherein a holder 35 is connected with the ends of the stationary connecting posts 5 of the vacuum switching vessels 1. Each holder 35 includes a chamber 36 which contains a bursting capsule 37. Around the approximately spherical body of the bursting capsule 37 is placed a loop of an insulating filament 41 which is connected with the actuating lever 42 of a microswitch 44. A tension spring 43 provides a bias in the direction of the desired switching movement of the microswitch 44. If the vacuum switching vessel 1 and thereby the stationary connecting post 5 are heated up excessively, this increased temperature is transmitted also to the holder 35 which consists of a material with preferably high thermal conductivity, and the bursting capsule 37 is made to break. Thereby, the loop of the filament looses its support and is pulled out of the holder 35 by the spring 43. The microswitch 44 is operated in this process.

As in the embodiment example according to FIG. 2, the three microswitches 44 in FIG. 3 can be connected in series with the coil of a signal relay. In both examples, a path of insulation is created by the filaments 26 and 41, respectively, between the voltage-carrying connecting post 5 and the protective device.

The protective arrangements are shown schematically in the figures. As far as their physical arrangement is concerned, there are numerous possibilities for modifications. For instance, the filament connections between the vacuum switching vessel and the switching arrangement may be run vertically downward, as shown, or also sideways or at an angle, so that the signal switches to be used can readily be incorporated into the mechanical construction of the switchgear.

In all embodiments, the switching vessels can be provided at an easily location, which location is warmed up quickly if there is a defect in the vessel, with a coating 50 (FIG. 1) or other marking of a substance which changes its color at a given temperature. This facilitates the identification of a defective vessel in multi-pole switchgear.

What is claimed is:

1. In a vacuum switching vessel equipped with contacts and with a member which undergoes a change in temperature when the operation of the switching vessel becomes deficient, the improvement comprising: detection means mounted in heat-conductive contact with the member of the switching vessel, said member having a low temperature time constant and undergoing a temperature change when the vacuum in said vessel is insufficient to extinguish the arc between said contacts when opened, and said detection means having a physical characteristic changeable in response to a limited change in temperature; interrupting means for interrupting the flow of current through the vacuum switching vessel; and, transducer means for translating said change in physical characteristic into a signal for actuating said interrupting means whereby the current through the vacuum switching vessel is interrupted.

2. The vacuum switching vessel of claim 1 wherein said member of the vacuum switching vessel is a stationary connecting post; said detection means being a body of Heusler alloy arranged on said connecting post; said transducer means including a permanent magnet magnetically held to said body; and, a spring-loaded switch connected to said magnet for initiating said signal when said body becomes paramagnetic in response to said change in the temperature of said member in response to a deficient operational capability of the switching vessel.

3. The vacuum switching vessel of claim 1, said detection means being a body made of a material that loses its strength when said member undergoes said change in temperature; and, said transducer means including a switch having a movable switching member movable between first and second positions, said movable switching member being connected to said body so as to be supported thereby in said first position so long as said body retains its strength and being movable to said second position to initiate said signal when said body loses its strength.

4. The vacuum switching vessel of claim 3 wherein said member of the vacuum switching vessel is a stationary connecting post, said body being a thread of thermoplastic material supported on said vacuum switching post and connected to said movable switching member of said switch.

5. The vacuum switching vessel of claim 3, said body being a burst capsule filled with liquid for bursting said burst capsule in response to said change in temperature.

6. The vacuum switching vessel of claim 1, said interrupting means including a protective device for opening the current path of the vacuum switching vessel, said protective device having contact means for opening the current path and a coil for actuating said contact means, said transducer means including switch means for interrupting the excitation current to said coil when said detection means responds to said change in temperature.

7. The vacuum switching vessel of claim 1 comprising indicating means for changing color in response to a change in temperature corresponding to deficient operational capability, said indicating means being located so as to be easily viewable thereby facilitating identification of a faulty switching vessel.

8. In a vacuum switching vessel equipped with contacts and with a member which undergoes a change in temperature when the operation of the switching vessel becomes deficient, the improvement comprising: detection means mounted in heat-conductive contact with the member of the switching vessel, said member having a low temperature time constant and undergoing a temperature change when the vacuum in said vessel is insufficient to extinguish the arc between said contacts when opened, and said detection means having a physical characteristic changeable in response to a limited change in temperature; and, transducer means for translating said change in physical characteristic into a signal for indicating the presence of deficient operational capability.

* * * * *